United States Patent
Mody et al.

(10) Patent No.: US 10,706,349 B2
(45) Date of Patent: Jul. 7, 2020

(54) SECURE CONVOLUTIONAL NEURAL NETWORKS (CNN) ACCELERATOR

(71) Applicant: TEXAS INSTRUMENTS INCORPORATED, Dallas, TX (US)

(72) Inventors: Mihir Narendra Mody, Karnataka (IN); Veeramanikandan Raju, Bangalore (IN); Chaitanya Ghone, Pune (IN); Deepak Poddar, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 120 days.

(21) Appl. No.: 15/730,316

(22) Filed: Oct. 11, 2017

(65) Prior Publication Data
US 2019/0005375 A1    Jan. 3, 2019

(30) Foreign Application Priority Data
May 25, 2017   (IN) .............................. 201741018440

(51) Int. Cl.
*G06N 3/04*   (2006.01)
*G06N 3/08*   (2006.01)
*H04L 29/06*  (2006.01)

(52) U.S. Cl.
CPC ............. *G06N 3/04* (2013.01); *G06N 3/0454* (2013.01); *G06N 3/088* (2013.01); *H04L 63/0435* (2013.01); *H04L 63/0464* (2013.01)

(58) Field of Classification Search
CPC .......... G06N 3/04; G06N 3/08; G06N 3/0454; G06N 99/005; H04L 63/0435
(Continued)

(56) References Cited

U.S. PATENT DOCUMENTS 4,972,473 A * 11/1990 Ejiri .................. H04N 1/448
                                                  380/243
10,157,333 B1 * 12/2018 Wang ................... G06T 1/0007
(Continued)

FOREIGN PATENT DOCUMENTS

CN   104408483 B  * 12/2014
CN   104408483 A  *  3/2015
(Continued)

OTHER PUBLICATIONS

Shun Tobiyama, et al., Malware Detection with Deep Neural Network Using Process Behavior, Aug. 2016, 2016 IEEE 40th Annual Computer Software and Applications Conference (COMPSAC), pp. 1-16.*
(Continued)

*Primary Examiner* — Farid Homayounmehr
*Assistant Examiner* — Raied A Salman
(74) *Attorney, Agent, or Firm* — Ebby Abraham; Charles A. Brill; Frank D. Cimino

(57) ABSTRACT

A Convolutional Neural Network (CNN) based-signal processing includes receiving of an encrypted output from a first layer of a multi-layer CNN data. The received encrypted output is subsequently decrypted to form a decrypted input to a second layer of the multi-layer CNN data. A convolution of the decrypted input with a corresponding decrypted weight may generate a second layer output, which may be encrypted and used as an encrypted input to a third layer of the multi-layer CNN data.

21 Claims, 8 Drawing Sheets

(58) Field of Classification Search
USPC .................................................. 380/8, 454
See application file for complete search history.

(56) References Cited

U.S. PATENT DOCUMENTS

| | | | |
|---|---|---|---|
| 2016/0350648 A1* | 12/2016 | Gilad-Bachrach | ....... G06N 3/08 |
| 2017/0124557 A1* | 5/2017 | Malliah | ................ H04L 9/3234 |
| 2017/0124558 A1* | 5/2017 | Molnar | ............... H04L 63/0807 |
| 2017/0372201 A1* | 12/2017 | Gupta | .................... G06N 3/084 |
| 2018/0023956 A1* | 1/2018 | Chen | ........................ H04W 4/33 |
| | | | 701/524 |
| 2018/0096243 A1* | 4/2018 | Patil | ....................... G06N 3/084 |
| 2018/0212782 A1* | 7/2018 | Csik | ................... G06F 21/6272 |

FOREIGN PATENT DOCUMENTS

| | | |
|---|---|---|
| CN | 104995633 A  * | 10/2015 |
| WO | WO209041350 A1 | 4/2009 |

OTHER PUBLICATIONS

Notification of Transmittal of the International Search Report and the Written Opinion of the International Searching Authority, or the Declaration for PCT/US 2018/034276, dated Oct. 11, 2018; 7 pages.

\* cited by examiner

US 10,706,349 B2

SECURE CONVOLUTIONAL NEURAL NETWORKS (CNN) ACCELERATOR

RELATED APPLICATIONS

This application claims the benefit of priority of Indian Provisional Patent Application No. is 201741018440 filed May 25, 2017, incorporated herein by reference.

BACKGROUND

Convolutional Neural Networks (CNN) is a class of deep, feed-forward artificial neural networks that has been successfully applied to analyzing visual imagery. That is, CNN provides one of the categories for Neural Networks that have been proven to be effective in areas such as image recognition and classifications. For example, the CNN are currently used to recognize image objects as such techniques may automatically learn three dimensional (3D) image features without the features being manually designed to capture depth invariances or deformations.

CNN may use a relatively little number of pre-processing steps as well as compared to other image classification algorithms. The CNN may learn or use coefficient filters that in traditional algorithms e hand-engineered. However, the use of the CNN has a boot time impact and vulnerability to malicious attacks during the signal processing. Accordingly, it Is important to avoid exposure of CNN coefficient filters or weights, inputs, and outputs to unauthorized access.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

SUMMARY

Described herein is a technology for a CNN based signal processing for multi-layer CNN data. An input image frame may be an input for a first layer of the multi-layer CNN data. The multi-layer CNN data may include an input layer, a first hidden layer, a second hidden layer (or multiple hidden layers), and an output layer.

The CNN based signal processing may include, receiving of an encrypted output from a layer (e.g., a first layer, a first hidden layer, etc.) of the multi-layer CNN data. The received encrypted output is subsequently decrypted to form a decrypted input to a subsequent layer (e.g., second layer, hidden layer, final output layer, etc.) of the multi-layer CNN data. A convolution of the decrypted input with a corresponding decrypted weight may generate a second hidden layer output, which may be encrypted and used as an encrypted input to another hidden layer of the multi-layer CNN data. After the signal processing of the layers of the multi-layer CNN data, the image classification may be generated as final output.

For the decryption of inputs and/or weights, and the encryption of the output, a particular key may be stored and used for the decryptions and encryptions as described herein.

DETAILED DESCRIPTION

Figure 1:
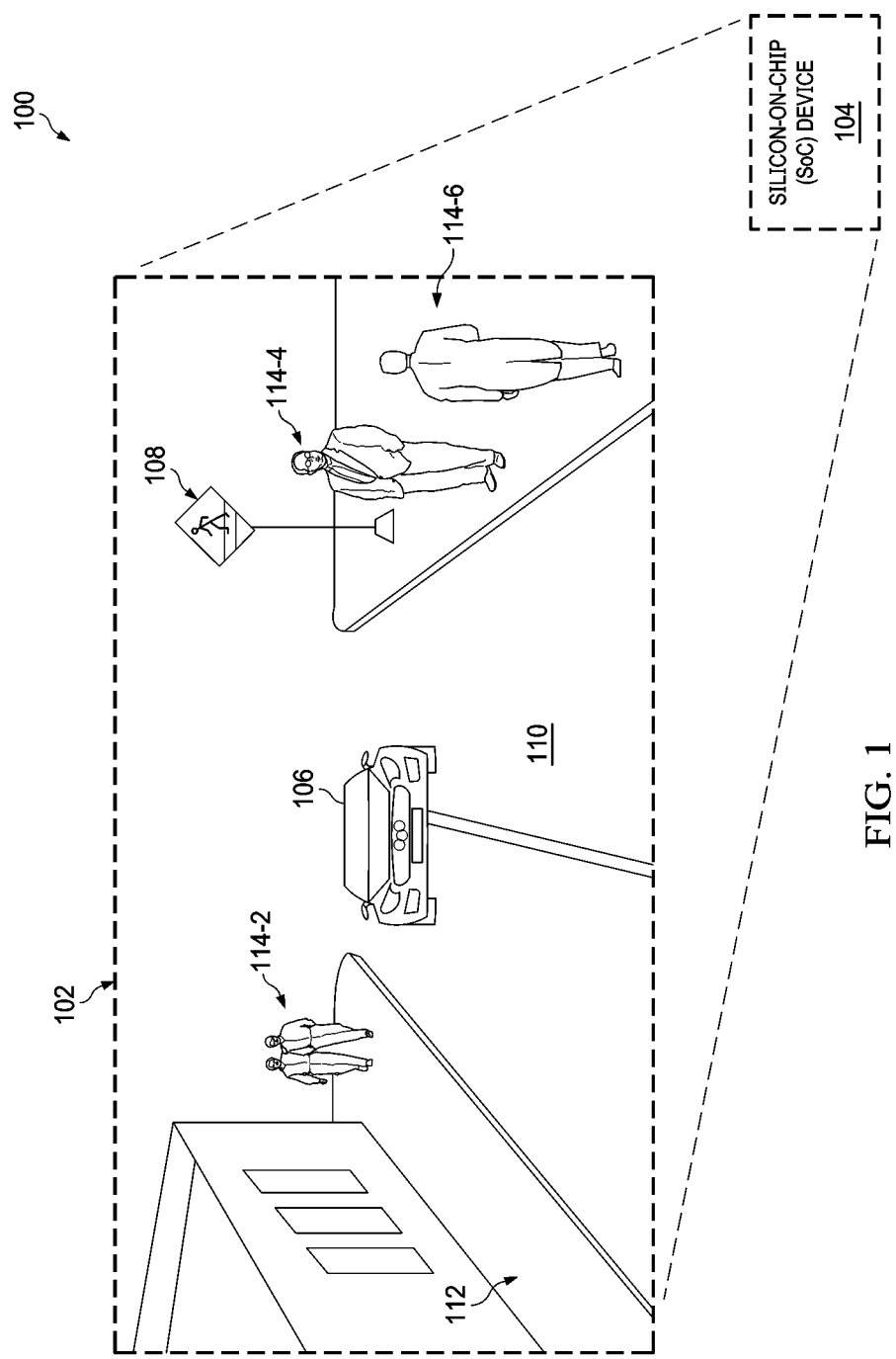
FIG. 1 illustrates an example scenario illustrating an example CNN based-signal processing as described herein.

FIG. 1 is an example scenario 100 illustrating an example CNN based signal processing as described herein. As shown, the scenario 100 may include an image frame 102 that may be supplied as an input to a device such as silicon-on-chip (SoC) device 104. The image frame 102 may be taken by a camera or other device, or has been previously stored, and thereafter used as input to the SoC device 104. Image frame may also be received from other sources. The input image frame 102 may represent a multi-layer CNN data input that may be processed for image classification by the SoC device 104.

The SoC device 104, for example, may include a CNN based signal processor system that may be configured to perform vision processing, such as image classifications, action recognitions, scene labelling, document analysis, advanced driver assistance systems (ADAS), autonomous driving systems/applications, etc. The CNN based signal processor system may be further configured to perform language processing such as speech recognition, automatic translation, and the like.

In this example, the image frame 102 may includes a car 106, a street sign 108, a road 110, a pedestrian lane 112, and pedestrians 114-2 to 114-6. The SoC device 104 may receive the input image frame 102 (i.e., multi-layer CNN data input) and performs signal processing that may include an application of an CNN algorithm on multiple layers of the input image frame 102. During the signal processing, the image frame 102, the CNN algorithm may utilize and process multiple layers (i.e., for a given layer, processing is performed with a previous output, where the given layer is convolved with the previous output) in order to differentiate and distinctly identify the car 106, street sign 108, road 110, pedestrian lane 112, and the pedestrians 114 of the image frame 102. As further described below, the CNN algorithm may utilize on-the-fly decryption of input and coefficient filters (or weights), and on-the-fly encryption of a layer output by using a specific keys supplied for purposes of decryptions and encryptions.

In an implementation, during the signal processing, each layer of the multi-layer CNN data may have a corresponding input and a corresponding output. As such, the corresponding input on each layer may be different from the input of another layer. In this implementation, the corresponding input may be processed (or convolved) using a corresponding weight to generate a particular output. The corresponding weight may be different for each layer. The input and the output to and from each layer may have different values. Furthermore, the corresponding input and weight may be decrypted. The output is encrypted by the SoC device 104 and used as an input to another layer of the multi-layer CNN data as further discussed below.

Although the example scenario 100 describes the SoC device 104 to be a single component, it is to be understood that other components such as processors, storage, applications, memory, etc. may be included with the SoC device 104.

Figure 2:
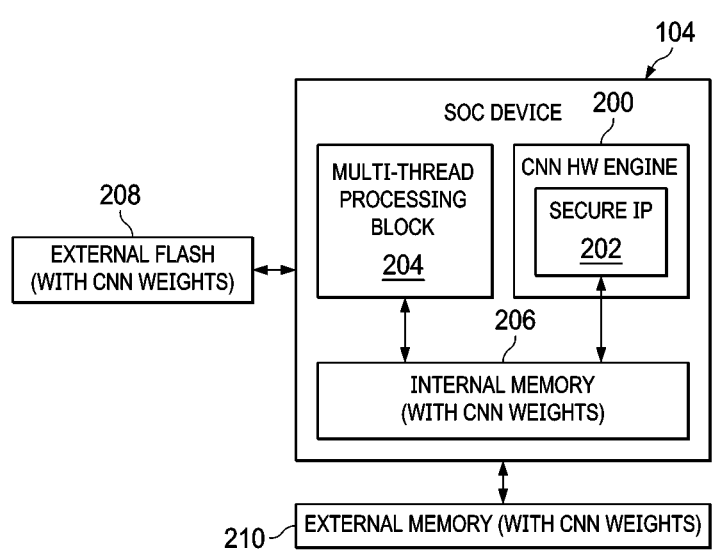
FIG. 2 illustrates an example silicon-on-chip (SoC) device for CNN based-signal processing as described herein.

FIG. 2 illustrates an example SoC device 104 for signal processing as described herein. As shown, the SoC device 104 may include a CNN hardware (HW) engine 200 with a secure IP (intellectual property) block 202, a multi-thread processing block 204, and an internal memory 206. The SoC device 104 may be further coupled to an external flash 208 and an external memory 210.

As an overview of the signal processing by the SoC device 104, filter coefficients (or weights) that may be used on the CNN algorithm may be encrypted and stored at memories that are external to the SoC device 104 i.e., external flash 208 and/or external memory 210. The encryption, for example, may include asymmetric encryption when storing the coefficient filters in order to prevent exposure of the stored weights to software (i.e., the weights may be configured to be accessible through hardware of the SoC device 104).

During the signal processing of a particular layer, an encrypted input, which may be an encrypted output of a previously processed layer, may be decrypted on-the-fly by the secure IP block 202. Similarly, the corresponding encrypted weight stored from the external memory may be decrypted on-the-fly, and convolved with the decrypted input to generate an unencrypted output. Thereafter, the unencrypted output may be encrypted at the secure IP block 202 and used as another encrypted input to a subsequent layer.

For these decryptions and encryptions, the secure IP block 202 may include a key features block (further described below in FIG. 3 as key features block 316) that are accessible by hardware and invisible from software side. As further discussed below, the key features block may provide different keys for each layer during the signal processing. The different keys may be used for the on-the-fly decryption of the input and weights, and the on-the-fly encryption of the output. The decryption keys for the weights may be fixed for each layer. In other words, for frame to frame processing, keys used for decryption of weights for each layer are fix.

At any time during the signal processing, the decrypted weights, the decrypted inputs, and the encrypted outputs may not be available to the external memories (i.e., external flash 208 and external memory 210) in order to prevent exposure to malicious attacks. Storing of the decrypted weights and input, and the encrypted output may be stored at the internal memory 206. Encrypting the output is implemented to prevent malicious attempts to provide a fixed pattern input to a given layer and allow the ability to decode the output and determine the weight of the given layer (and other layers), since output=weight*input.

Furthermore, the decrypted weights and the decrypted input may be directly provided to other blocks within the secure IP block 202 without software intervention. That is, the CNN HW engine 200 may be configured to retrieve and use directly the decrypted weights and decrypted input through a hardware concurrent parallel execution of security engines for hidden layers during the signal processing. The CNN HW engine 200, for example, may implement parallel execution of convolutions of the decrypted inputs and weights, and to supply the output back to the secure IP block 202 to form an encrypted output.

Referencing the image frame 102 of FIG. 1 above, the image classification may be performed through secure decryptions and/or encryptions by the secure IP block 202 with the use of corresponding keys as further discussed below.

The image classification may include convolution of each layer of the multi-layer CNN data with the corresponding stored encrypted weights from the external memory 210 to differentiate and distinctly identify each of the car 106, street sign 108, road 110, pedestrian lane 112, and the pedestrians 114 of the input image 102.

For example, to differentiate and distinctly identify the car 106, the signal processing of the multi-layer CNN data may include a first pattern of: decrypting of a first input; a convolution of the decrypted first input with a decrypted first weight, which is retrieved from the external memory; pooling an output of the first convolution; and encrypting of a first output. In this example, a second pattern may include: decrypting the previous encrypted first output to become a decrypted second input to a next layer; convoluting the decrypted second input with a decrypted second weight from the external memory; pooling an output of the second convolution; and encrypting a second output. A third pattern may follow similar steps until the last layer where an integration of all outputs may generate the differentiation and identification of the car 106 from the other objects such as street sign 108, road 110, etc. Furthermore, the decryptions and encryptions on the first, second, etc. patterns may utilize key or keys at the key features block of the secure IP block 202.

In certain implementations, to differentiate and distinctly identify the street sign 108, a similar multiple layer signal processing to derive the street sign 108 may include a first pattern of decrypting of a first input, a convolution of the decrypted first input with a decrypted first weight from the external memory, pooling an output of the first convolution, and encrypting a first output. In such implementations, a second pattern may include decrypting the previous encrypted first output to become a decrypted second input to a next layer, convoluting the decrypted second input with a decrypted second weight from the external memory, pooling an output of the second convolution, and encrypting a second output. A third pattern may follow similar steps until the last layer where an integration of all outputs may generate the differentiation and identification of the street sign 108. Similarly, the decryptions and encryptions on the first, second, etc. patterns may utilize key or keys at the key features block of the secure IP block 202.

With regard to the road 110, pedestrian lane 112, and the pedestrians 114 of the image frame 102, the signal processing as described for the car 106 or the street sign 108 may similarly apply. That is, the identification of each object may include convolution of inputs and weights for multiple layers, and performing the image classification after the signal processing of the last layer of the multi-layer CNN data.

As described herein, the secure IP block 202 may be configured to perform the on-the-fly decryption of the input and weights, and the on-the-fly encryption of the output for each layer during the signal processing. The secure IP block 202 may utilize the key features block that are not accessible through software. In other words, the key features block may be configured distinctly on each SoC device 104 to provide secure different keys for each layer during the signal processing. The secure different keys may be used for the on-the-fly decryption of the input and weights, and the on-the-fly encryption of the output.

Furthermore, the CNN HW engine 200 may utilize first-in-first-out (FIFO) for memory pre-fetching in order to avoid latency between the memory fetching and the on-the-fly decryptions and encryptions by the secure IP block 202. Each CNN channel operation may further interface to control block-chaining. For example, to allow easy random access, the decryptions of the input and output may require disabling of the block-chaining. On the other hand, the decryption of the weight using the block-chaining may provide higher security.

As described herein, each initial layer for different objects of the image frame 102 may not require encryption since the initial layer comes directly from the image data such as the input image frame 102. Similarly, each final layer for the different objects may not require encryption prior to classification stage or the differentiation of each object such as the car 106, street sign 108, etc.

The multi-thread processing block 204 may be configured to support the signal processing of the multiple layers corresponding to each object of the image frame 102. For example, the multi-thread processing block 204 may include a combination of software and hardware that supports the convolution of inputs and weights for each layer at the CNN HW engine 200. The multi-thread processing block 204 may be coupled to the internal memory 206 in supporting the convolution of inputs and weights for each layer at the CNN HW engine 200.

In an implementation, the internal memory 206 may be configured to store CNN weights that are used at the secure IP BLOCK. For example, the stored CNN weights may include encrypted weights that are accessible within the SoC device 104. In this example, the encrypted weights may be accessible by the CNN HW engine 200 through hardware means and not through software. The reason being, the keys on the key features block are stored using asymmetric encryption. That is, these keys on the key features block are accessible through the CNN HW engine 200 but not visible from software. Thus, the SoC Device 104 may provide CNN specific protection mechanism by hardware and software security features such as enabling secure exchange of CNN weights during multiple layer signal processing.

Figure 3:
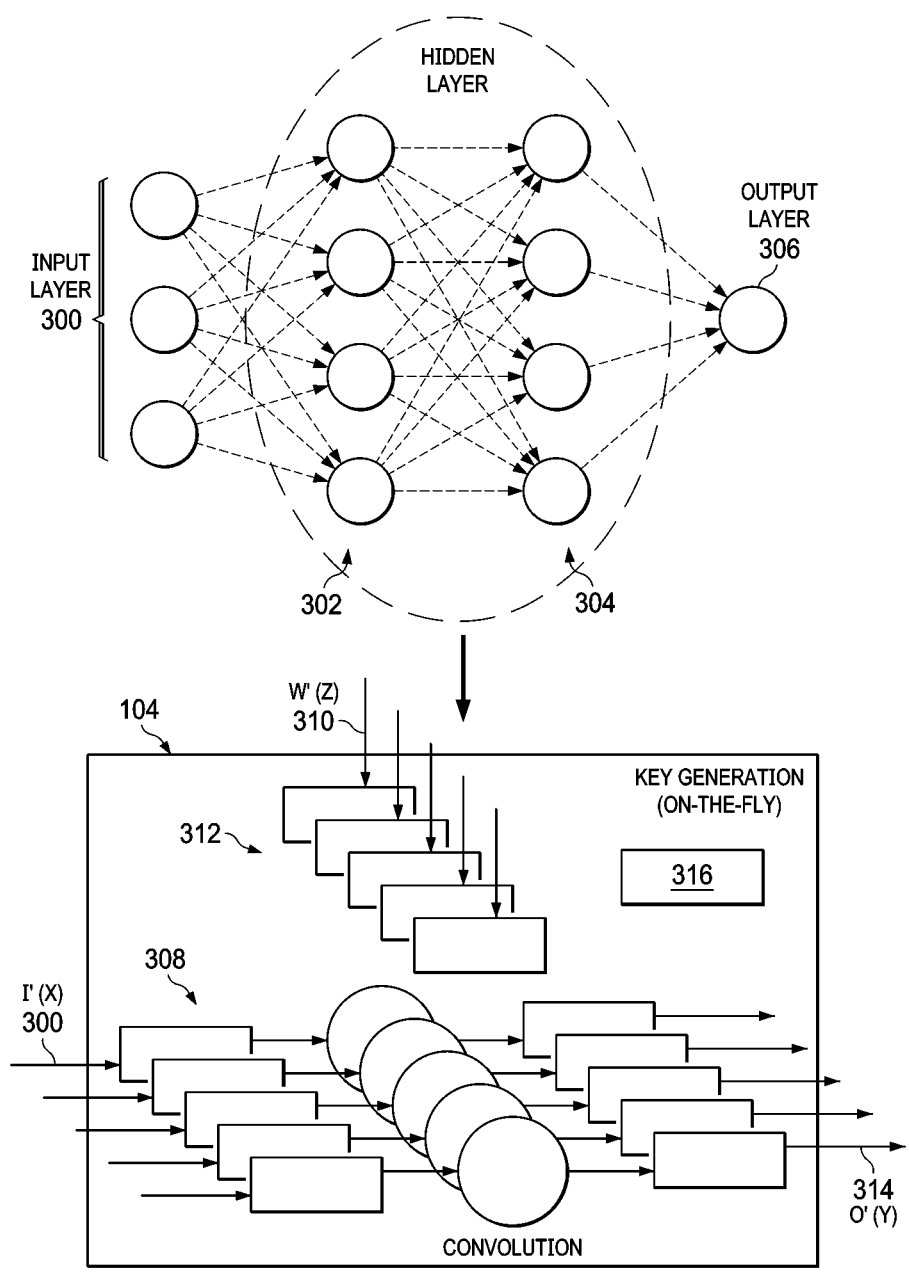
FIG. 3 illustrates an example illustration of CNN specific protection mechanism during a signal processing as described herein.

FIG. 3 illustrates an example illustration of CNN specific protection mechanism during a signal processing as described herein. As shown, FIG. 3 illustrates an example outline of a multi-layer CNN data that may include an input layer 300, a first hidden layer 302, a second hidden layer 304, and an output layer 306.

To implement or process the example outline of the multi-layer CNN data through the SoC device 104, an encrypted input layer 300 may be transformed by the secure ID 202 into a decrypted input layer as represented by decrypted input layer 308. Similarly, stored encrypted weights 310 from external memories (as discussed above) may be retrieved and transformed by the secure ID 202 to form decrypted weights 312.

After convolution of the decrypted input layer 308 with the decrypted weights 312, encrypted outputs 314 may be generated and used as an encrypted input to another hidden layer until the last hidden layer and output layer are processed to provide the image classifications.

As described herein, the decryptions of the encrypted input layer 300 and encrypted weights 310 may use keys that may be stored at key feature block 316. The key feature block 316 may supply the keys to secure IP block 202 in order to perform on-the-fly decryptions and encryptions. Furthermore, different keys may be supplied to different layers of the multi-layer CNN data. Furthermore still, and in another embodiment, the keys may be stored using asymmetric encryption in the external memory rather than within the SoC device 104.

Referencing the image frame 102 of FIG. 1, the equivalent example multi-layer CNN data outline shown in FIG. 3 may include additional hidden layers and convolutions and may not be limited to the first hidden layer 302 and the second hidden layer 304. That is, multitudes of hidden layers may be required during the signal processing of the image 102 in order to differentiate and distinctly identify the car 106, street sign 208, etc. Each hidden layer may utilize a different set of supplied keys for on-the-fly decryptions of the input layer 300 and retrieved weights 310, and on-the-fly encryptions of the convolution output.

As described herein, the key features block 316 may not be visible to software but accessible through hardware in order to protect decryptions and encryptions from malicious attack. Furthermore, during the signal processing, the decrypted input layer 308, decrypted weights 312, and the encrypted outputs 314 may not be stored at external memories such as the external flash 208 and the external memory 210. Instead, the decrypted input layer 308, decrypted weights 312, and the encrypted outputs 314 may be stored at the internal memory 206.

Figure 4:
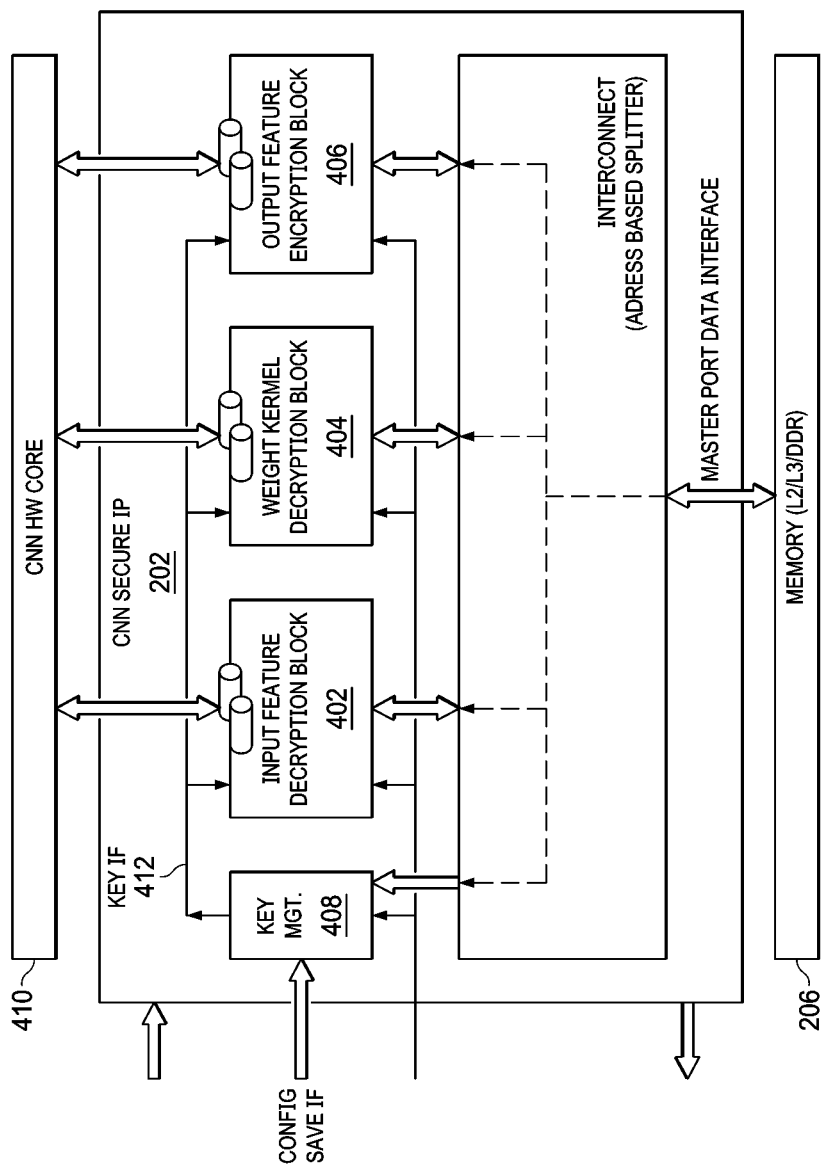
FIG. 4 illustrates an example block diagram of the secure IP as described herein.

FIG. 4 illustrates an example block diagram of the secure IP block 202 as described herein. As shown, the CNN secure IP block 202 may include: an input feature decryption block 402 that may be configured to receive and decrypt the input layer 300; a weight kernel decryption block 404 that may be configured to receive and decrypt the weight 310 that are stored from the external memories; an output feature encryption block 406 that may be configured to encrypt convolution outputs from the CNN HW engine 200; a key management 408 that may be configured to decrypt the asymmetrically encrypted keys from the external memories, and to supply the decrypted keys used for decryptions and encryptions; and a CNN HW core 410, which is similar to the CNN HW engine 200.

As described herein, the key management 408 may receive encrypted keys from the external memories such as the external memory 210. At the secure IP block 202, and during the signal processing, different keys may be supplied for each layer of the multi-layer CNN data. Furthermore, the different keys may not visible by software and may be supplied to the input feature decryption block 402 and other blocks within the secure IP block 202 through a bus line 412. In other words, the different keys may be supplied to the different blocks on the secure IP block 202 without software intervention.

The input feature decryption block 400 and the weight kernel decryption block 404 may be configured to perform on-the-fly decryptions using the different keys from the key management 408. Similarly, the output feature encryption block 406 may perform on-the-fly encryptions using the different keys from the key management 408. The on-the-fly decryptions and encryptions over the multiple layers or channels may ensure zero boot-time impact and complete protection from weight-interference during run-time. Furthermore, the on-the-fly decryptions and encryptions may be disabled and toggled via the key management 408.

In certain implementations, on-the-fly allows for inputs or weights after decryption to directly pass to the CNN HW core 410 without storing in any internal or external memory (e.g., memory 206, memory 210). In any event, content is not readable (compromised) by software during on-the-fly.

The key management 408 may be configured to provide a key to the input feature decryption block 402 for on-the-fly decryption of the encrypted output. The key may be considered a master or private key. The master or private key can be used asymmetric encryption and decryption. The master or private key can be stored inside the SoC 104. In certain implementations, the master or private key is programmed via an EEPROM, burned in device 104 during manufacture, or may be burned in by a user/customer). In effect in such implementations, the master or private key is used exclusively within the SoC 104, and particularly within secure IP block 202.

As discussed above, different keys may be supplied for each layer of the multi-layer CNN data. The master or private key may be used for decryption for the different or layer keys. The key management 408 may provide the different keys for different layers of the multi-layer CNN data. These layer keys may be used for symmetric encryption/decryption and passed directly during such encryption and decryption as performed for processing weights, input and output. The layer keys are not processed by software nor are readable by software.

Inputs, which may use a "configuration save interface (IF)", to the key management 408 may include the master or private key, which may be used for asymmetrical encryption/decryption, and two key pairs (private & public) used in asymmetrical encryption/decryption. Data may be encrypted using the public key, and during decryption, the master or private key is used to decode the data. The public key can be made available to allow anyone to encrypt; however only the private key can decrypt back the data. This may be implemented using the Rivest-Shamir-Adleman (RSA) algorithm. Other inputs to the key management 408 may include a list of encrypted keys for each layer. These keys may be encrypted using asymmetrical encryption/decryption.

Output, which may use a "key interface (IF)", from the key management 408 may include particular layer keys to blocks 402, 404, and 406 used for weights, input and output. Symmetrical encryption/decryption may be used and makes use of identical keys for encryption and decryption process. Therefore, the same key is preserved/provided by the key management 408. Symmetrical encryption may be used for large data (e.g., weight, input, and output). The algorithm that is used may be the Advanced Encryption Standard (AES).

During the signal processing, the CNN HW core 410 may perform concurrent parallel execution of security engines for the hidden layers. For example, the CNN HW core 410 may execute parallel convolution of multi-layer CNN data in order to classify the car 106, street sign 108, etc. In this example, the CNN HW core 410 is directly coupled to the CNN secure IP block 202 so that during the signal processing, the decrypted input/output and the decrypted weights may not be visible to software. In this regard, the CNN HW core 410 may protect hidden layers outputs and further prevent indirect inference on the weight information. Furthermore, the CNN HW core 410 may use block-chaining to generate CNN acceleration as further discussed below.

Figure 5:
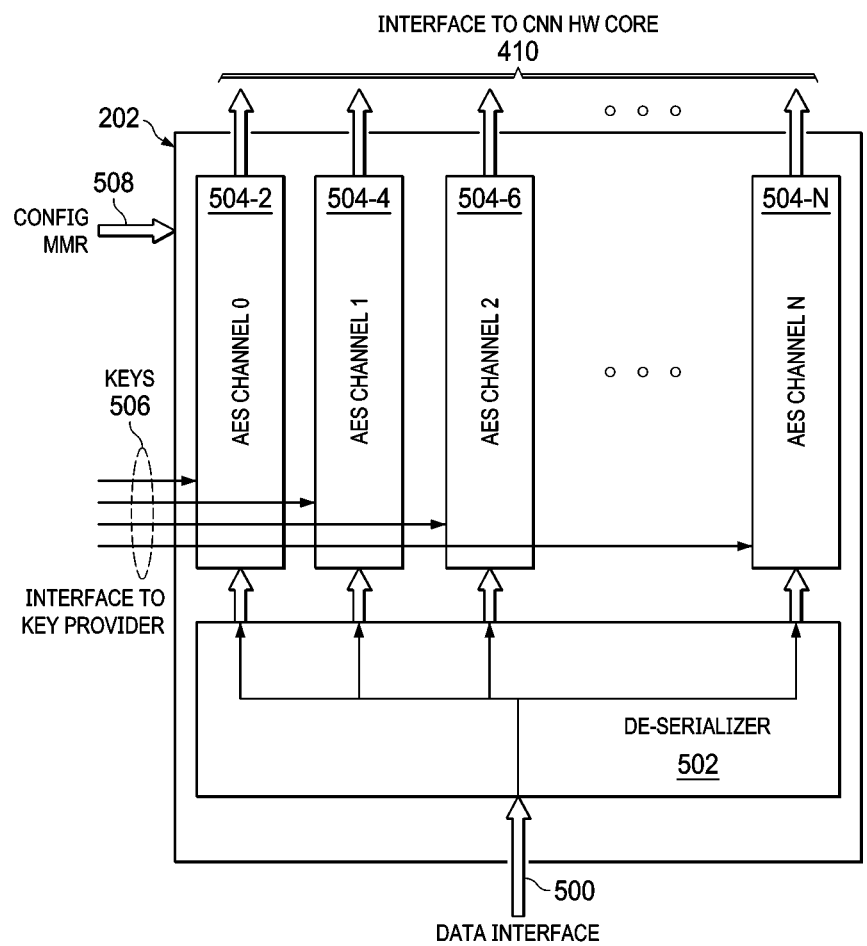
FIG. 5 illustrates an example parallel execution of CNN based-signal processing as described herein.

FIG. 5 illustrates an example parallel execution of CNN based-signal processing as described herein. As shown, a data interface 500 may supply a single data-stream of a multi-layer CNN data to a deserializer component 502. In turn, the deserializer component 502 may be configured to supply hidden layers of the multi-layer CNN data to Advanced Encryption Standard (AES) channels 504-2 to 504-N, where N may be a number of hidden layers to be processed by the CNN HW core 402. For each AES channels 504-2 to 504-N, corresponding keys 506-1 to 506-N may be independently supplied for the decrypting of the input and weights as described herein. Furthermore, the keys 506-1 to 506-N, for example, may be stored in a memory that is external to the secure IP block 202.

In an implementation, each set of keys 506 may be different for each layer of the multi-layer CNN data. For example, referring to FIG. 3 above, a first set of keys 506 may be applied to the first hidden layer 302 while a second set of keys 506 may be applied to the second hidden layer 304. In this example, the first set of keys may be different from the second set of keys. Furthermore, the first hidden layer 302 and the second hidden layer 304 may be processed in parallel by the AES channels 504-2 to 504-2, respectively.

As described herein, the AES channels 504 may implement secure decryption and encryption of the input, weights, and layer output by using hardware functionalities such as the CNN HW core 410. That is, the input, weight, and output that are being utilized in the AES channels 504 and the CNN HW core 410 are not visible to software i.e., not accessible through software from outside of the SoC device 104.

To disable or enable block-chaining, a config-MMR 508 may be configured to perform disabling of the block-chaining to allow easy random access and/or to provide higher security during the signal processing. The block-chaining may be implemented by the secure IP block 202 to perform CNN acceleration.

Figure 6:
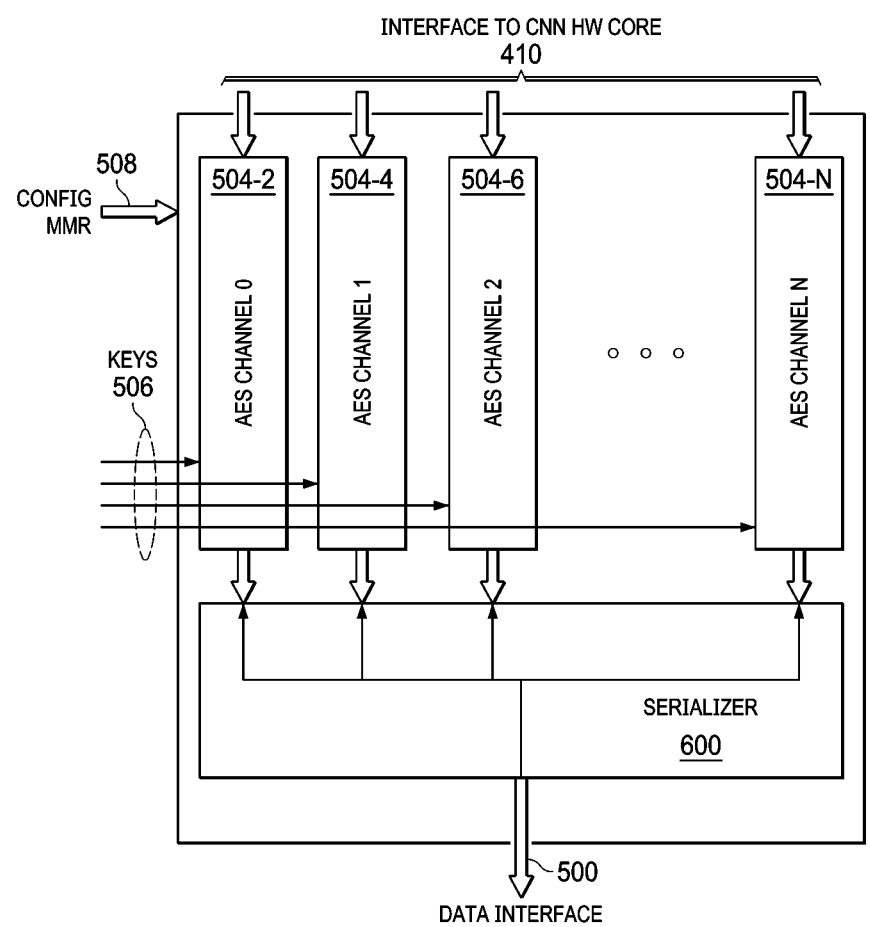
FIG. 6 illustrates an example of parallel execution of CNN based-signal processing as described herein.

FIG. 6 illustrates another example of parallel execution of CNN based signal processing as described herein. In contrast to FIG. 5 above, which describes the decryption of the input and weights prior to signal processing at the CNN HW core 410, FIG. 6 may describes an encryption of a convolution output from the CNN HW core 410 where the encrypted convolution output may be utilized as an input to another layer of the multi-layer CNN data.

As shown, the CNN HW core 410 may supply convoluted data as an output of the layer being processed. The convoluted data may include parallel convolution of the decrypted inputs and the corresponding decrypted weights. The convoluted data may be supplied to the AES channels 504 for encryption using the set of keys that may be supplied by the keys 506.

In an implementation, a serializer 600 may be configured to transform the encrypted convoluted data output into a signal data-stream of encrypted output, which may thereafter be used as an encrypted input to another layer of the multi-layer CNN data. After the processing of all hidden layers, the serializer 600 may output different classifications of the image frame 102.

Figure 7:
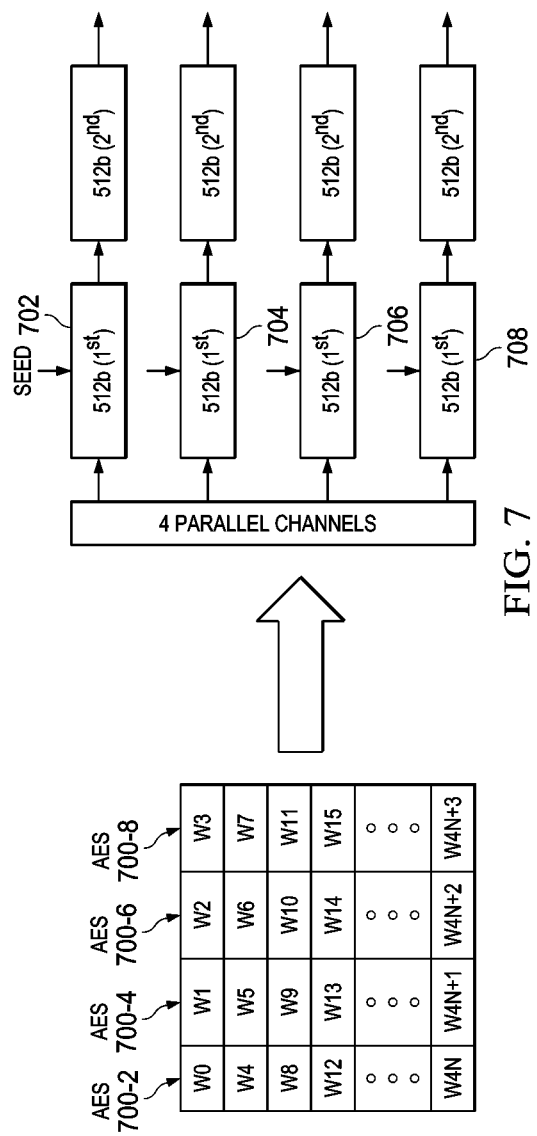
FIG. 7 illustrates an example block-chaining that may be implemented during a signal processing as described herein.

FIG. 7 shows an example block-chaining 700 that may be implemented during a signal processing as described herein. The example block-chaining 700 may be implemented on different channels of convolution running in parallel instead of all sequential data in memory. For example, the use of block chaining for encrypting weights may allow parallel decryption of weights as well.

As shown, four AES block chains 700 that may correspond to four simultaneous channel convolution weights may be stored contiguously in a memory. The number of AES block chains 700 may be limited by a bus size of a memory interface. For example, for an encryption block of 128 bits and a memory bus interface of 512 bits, the number of AES block chain 700 may be limited to four blocks i.e., 512/128=4.

Referencing FIG. 7, each of the memory bus interfaces 702-708 may include 512 bits. In this regard, the resulting four AES block chains 700 may be represented by the four parallel channels that may be executed in parallel.

For example, when the four channels execute in parallel, weights of kernels for each of the channel may form block-chains for encryption or decryption. In this example, the block-chains may be enabled or disabled to provide higher security and/or to allow easy random access. Dynamic block-chaining of weights can enable decrypting in parallel multiple sets of sub-weights.

Figure 8:
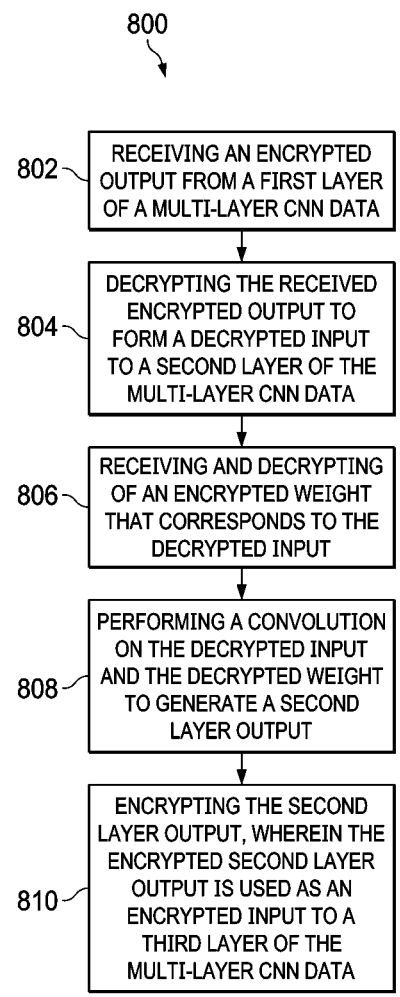
FIG. 8 illustrates an example process chart illustrating an example method for a CNN based-signal processing as described herein.

FIG. 8 shows an example process chart 800 illustrating an example method for CNN based-signal processing as described herein. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 802, receiving an encrypted output from a first layer of a multi-layer CNN data is performed. For example, the image frame 102 may represent the multi-layer CNN data. In this example, the multi-layer CNN data may be represented by the example outline as shown in FIG. 3. That is, the first hidden layer 302 is the first layer of the multi-layer CNN data where the first layer may supply the encrypted output.

At block 804, decrypting the received encrypted output to form a decrypted input to a second layer of the multi-layer CNN data is performed. For example, the input feature decryption block 402 may be configured to receive and decrypt encrypted output from the first layer. In this example, the decrypted output may be used as an input to a second layer (i.e., second hidden layer 304) of the multi-layer CNN data.

At block 806, receiving and decrypting of an encrypted weight that corresponds to the decrypted input is performed. For example, the weight kernel decryption block 404 may be configured to receive and decrypt an encrypted weight that corresponds to the decrypted input.

At block 808, performing a convolution on the decrypted input and the decrypted weight to generate a second layer output is performed. For example, the CNN hardware (HW) core 410 or the CNN HW engine 200 may be configured to perform a convolution of the input and the decrypted weight to generate a second layer output.

At block 810, encrypting the second layer output, wherein the encrypted second layer output is used as an encrypted input to a third layer of the multi-layer CNN data is performed. For example, the output of the second hidden layer 304 may be encrypted and used as an input to a subsequent layer of the multi-layer CNN data.

In the above decryption input and/or weights, and the encryption of the output, the key management 408 may supply the corresponding keys 506 for the decryption and encryptions.

What is claimed is:

1. A method of signal processing comprising:
receiving an encrypted output from a first layer of a multi-layer convolutional neural networks (CNN) data;
decrypting the received encrypted output to form a decrypted input to a second layer of the multi-layer CNN data using a first cryptographic key, the first cryptographic key is part of a first cryptographic key pair;
receiving an encrypted weight that corresponds to the decrypted input;
decrypting the received encrypted weight uses a second cryptographic key, the second cryptographic key is part of a second cryptographic key pair, and the second cryptographic key pair is different than the first cryptographic key pair;
performing a convolution on the decrypted input and the decrypted weight to generate a second layer output;
and encrypting the second layer output to form an encrypted second layer output, wherein the encrypted second layer output is used as an encrypted input to a third layer of the multi-layer CNN data.

2. The method of claim 1, wherein the second layer is any layer of the multi-layer CNN data.

3. The method of claim 1, wherein the encrypting the second layer output is not performed if the second layer is a last layer of the multi-layer CNN data.

4. The method of claim 1, wherein the decrypting the received encrypted output and the encrypting are symmetric key decryption and encryption, respectively.

5. The method of claim 1, wherein the decrypting the received encrypted output and the encrypting are on-the-fly decryption and encryption, respectively.

6. The method of claim 1, wherein the first and second cryptographic keys are different and the first and second cryptographic keys are stored at an external memory using an asymmetrical encryption.

7. The method of claim 1, wherein different cryptographic keys are used for decrypting different layers of the multi-layer CNN data, and wherein different cryptographic keys are used for encrypting different layers of the multi-layer CNN data.

8. The method of claim 1, wherein the encrypted weight is stored at an external memory.

9. The method of claim 1, the decrypting of the encrypted weight utilizes a block-chaining to provide higher security.

10. The method of claim 1, wherein an input to the first layer is an unencrypted layer of an image frame.

11. A silicon-on-chip (SoC) device comprising;
an input feature decryption block configured to:
receive an encrypted output from a first layer of a multi-layer convolutional neural networks (CNN) data; and
decrypt the received encrypted output using a first cryptographic key, wherein the decrypted output is used as an input of a second layer of the multi-layer CNN data and the first cryptographic key is part of a first cryptographic key pair;
a weight kernel decryption block configured to:
receive an encrypted weight that corresponds to the input of the second layer;
and decrypt the received encrypted weight using a second cryptographic key, the second cryptographic key is part of a second cryptographic key pair, and the second cryptographic key pair is different than the first cryptographic key pair;
a CNN hardware (HW) core configured to perform a convolution of the input and the decrypted weight to generate a second layer output;
and an output feature encryption block configured to encrypt the second layer output to form an encrypted second layer output, wherein the encrypted second layer output is used as an encrypted input to a third layer of the multi-layer CNN data.

12. The SoC device of claim 11 further comprising a key management that is configured to provide the first cryptographic key to the input feature decryption block.

13. The SoC device of claim 12, wherein the first cryptographic key is stored using an asymmetrical encryption in a memory that is external to the SoC device.

14. The SoC device of claim 11, wherein the encrypted weight is stored in a memory that is external to the SoC device.

15. The SoC device of claim 11, the decrypting of the encrypted weight utilizes a block-chaining to provide higher security.

16. The SoC device of claim 15, wherein decrypting of the encrypted output is performed by disabling the block-chaining to allow easy random access.

17. A device comprising;
an external memory; and
a silicon-on-chip (SoC) device coupled to the external memory, the SoC device comprising:
an input feature decryption block configured to:
receive an encrypted output from a first layer of a multi-layer convolutional neural networks (CNN) data; and
decrypt the received encrypted output using a first cryptographic key, wherein the decrypted output is used as an input of a second layer of the multi-layer CNN data and the first cryptographic key is part of a first cryptographic key pair;
a weight kernel decryption block configured to:
receive an encrypted weight from the external memory, the received encrypted weight corresponding to the input of the second layer; and
decrypt the received encrypted weight using a second cryptographic key, the second cryptographic key is part of a second cryptographic key pair, and the second cryptographic key pair is different than the first cryptographic key pair;
a CNN hardware (HW) core configured to perform a convolution of the input and the decrypted weight to generate a second layer output;
an output feature encryption block configured to encrypt the second layer output to form an encrypted second layer output, wherein the encrypted second layer output is used as an encrypted input to a third layer of the multi-layer CNN data.

18. The device of claim 17, wherein the first cryptographic key is stored using an asymmetrical encryption in the external memory.

19. The device of claim 17, wherein the first cryptographic key is a master key used for encryption and decryption and stored within the SoC device and not readable by software.

20. The device of claim 17, further comprising a key management memory configured to store the first cryptographic key and the second cryptographic key.

21. The device of claim 17, wherein the decrypting of the encrypted weight utilizes a block-chaining to provide higher security.

* * * * *